US009258176B2

(12) United States Patent
Jallapelli et al.

(10) Patent No.: US 9,258,176 B2
(45) Date of Patent: Feb. 9, 2016

(54) DEVICE MANAGEMENT METHOD, SERVER AND SYSTEM AND MOBILE EQUIPMENT

(71) Applicant: Samsung Electronics Co., Ltd, Gyeonggi-do (KR)

(72) Inventors: Vanisri Srikrishna Jallapelli, Bangalore (IN); Golla Murali Krishna Yadav, Bangalore (IN); Prabhu Kumar, Bangalore (IN)

(73) Assignee: Samsung Electronics Co., Ltd, Suwon-si (KR)

( * ) Notice: Subject to any disclaimer, the term of this patent is extended or adjusted under 35 U.S.C. 154(b) by 234 days.

(21) Appl. No.: 13/936,053

(22) Filed: Jul. 5, 2013

(65) Prior Publication Data
US 2014/0012993 A1    Jan. 9, 2014

(30) Foreign Application Priority Data

Jul. 6, 2012   (IN) ............................ 2746/CHE/2012

(51) Int. Cl.
| | |
|---|---|
| *H04L 29/08* | (2006.01) |
| *H04W 4/00* | (2009.01) |
| *H04W 8/00* | (2009.01) |
| *H04L 12/24* | (2006.01) |
| *H04W 8/24* | (2009.01) |
| *H04W 92/24* | (2009.01) |
| *H04L 12/26* | (2006.01) |

(52) U.S. Cl.
CPC ........ *H04L 29/08153* (2013.01); *H04L 41/082* (2013.01); *H04W 4/001* (2013.01); *H04W 8/005* (2013.01); *H04L 43/0811* (2013.01); *H04L 43/0817* (2013.01); *H04W 8/245* (2013.01); *H04W 92/24* (2013.01)

(58) Field of Classification Search
CPC ............ H04L 29/08153; H04L 41/082; H04L 43/0817; H04L 43/0811; H04W 92/24; H04W 8/245; H04W 8/005; H04W 4/001
See application file for complete search history.

(56) References Cited

U.S. PATENT DOCUMENTS

| | | | |
|---|---|---|---|
| 8,768,845 B1 * | 7/2014 | Persson et al. ................... 705/51 |
| 2004/0230996 A1 * | 11/2004 | Takeuchi ............ G06F 17/3089 725/109 |
| 2006/0236325 A1 * | 10/2006 | Rao et al. ...................... 719/315 |
| 2008/0046583 A1 | 2/2008 | Rao |
| 2008/0102816 A1 * | 5/2008 | Shan ...................... H04W 8/02 455/424 |
| 2008/0160983 A1 | 7/2008 | Poplett et al. |
| 2008/0225780 A1 * | 9/2008 | McCormick et al. ......... 370/328 |

(Continued)

FOREIGN PATENT DOCUMENTS

| | | |
|---|---|---|
| EP | 2 372 537 A1 | 10/2011 |
| WO | WO 2005/121989 A1 | 12/2005 |
| WO | WO 2011/123329 A1 | 10/2011 |

OTHER PUBLICATIONS

Nokia, "Security and device management—Nokia Eseries", Mar. 2011, Nokia Eseries, Mar. 2011, 10 Pages.*

(Continued)

Primary Examiner — Brian J Gillis
Assistant Examiner — Amy Ling

(57) ABSTRACT

A method and system remotely manage a Mobile Equipment (ME). All the different service provider DM servers interconnected with each other to perform data recovery and locking operations in the ME. The DM servers of multiple service providers collaborate and provide interoperable services to the connected mobile equipments.

20 Claims, 8 Drawing Sheets

(56) References Cited

U.S. PATENT DOCUMENTS

| | | | |
|---|---|---|---|
| 2011/0173685 A1* | 7/2011 | Chai | H04L 41/0806 726/6 |
| 2011/0295992 A1 | 12/2011 | Lee et al. | |
| 2012/0059924 A1* | 3/2012 | Zhang | H04L 29/1216 709/223 |
| 2013/0263212 A1* | 10/2013 | Faltyn et al. | 726/1 |
| 2013/0339517 A1* | 12/2013 | Agbabian | H04L 63/0807 709/224 |

OTHER PUBLICATIONS

3GPP2 C.S0064-0, "IP Based Over-the-Air Device Management (IOTADM) for cdma2000 Systems", Jan. 2011, 3GPP2, Version 2.0, 70 Pages.*

Open Mobile Alliance, "OMA Device Management Representation Protocol", Approved Version 1.2.1, Jun. 17, 2008, OMA, 47 Pages.*

Horn, "3GPP Femtocells: Architecture and Protocols", Qualcomm, Sep. 2010, 64 pages.*

Extended European Search Report issued on Nov. 8, 2013 in connection with European Patent Application No. 13175383.2, 8 pages.

Open Mobile Alliance; "Enabler Release Definition for Client Provisioning"; Version 1.1; Jul. 2009.

Open Mobile Alliance; "Enabler Release Definition for OMA Device Management"; Version 1.2.1; Jun. 17, 2008.

Open Mobile Alliance; "Enabler Release Definition for OMA Device Management"; Version 2.0; May 31, 2012.

Open Mobile Alliance; "Enabler Release Definition for OMA Device Management (based on SyncML DM)"; Version 1.1.2; Dec. 2003.

Open Mobile Alliance; "Enabler Test Specification for Client Provisioning v1.1"; Version 1.1; Apr. 21, 2008.

Open Mobile Alliance; "Enabler Test Specification for Device Management"; Version 1.2; Jan. 28, 2011.

Open Mobile Alliance; "Enabler Test Specification for Presence Simple"; Historic Version 1.0; May 30, 2006.

Open Mobile Alliance; "Device Management Requirements"; Version 1.2; Feb. 9, 2007.

Open Mobile Alliance; "SyncML Device Management Tree and Description"; Version 1.1.2; Dec. 2, 2003.

Open Mobile Alliance; "OMA Device Management Protocol"; Version 1.2.1; Jun. 17, 2008.

Open Mobile Alliance; "OMA Device Management Tree and Description"; Version 1.2.1; Jun. 17, 2008.

Open Mobile Alliance; "Provisioning Architecture Overview"; Version 1.1; Jul. 28, 2009.

ETSI TR 145 913; V8.0.0; "Digital cellular telecommunications system (Phase 2+); Optimized transmit pulse shape for downlink Enhanced General Packet Radio Service (EGPRS2-B)" (3GPP TR 45.913 version 8.0.0 Release 8) Global System for Mobile Communications; Oct. 2010.

ETSI TR 145 913; V10.0.0; "Digital cellular telecommunications system (Phase 2+); Optimized transmit pulse shape for downlink Enhanced General Packet Radio Service (EGPRS2-B)" (3GPP TR 45.913 version 10.0.0 Release 10) Global System for Mobile Communications; Apr. 2011.

ETSI TS 125 101; V6.19.0; "Universal Mobile Telecommunications Systems (UMTS); User Equipment (UE) radio transmission and reception (FDD)" (3GPP TS 25.101 version 6.19.0 Release 6) Mar. 2009.

ETSI TS 125 101; W.18.0; "Universal Mobile Telecommunications System (UMTS); User Equipment (UE) radio transmission and reception (FDD)" (3GPP TR 25.101 version 7.18.0 Release 7); Oct. 2010.

ETSI TS 125 101; V8.15.0; "Universal Mobile Telecommunications System (UMTS); User Equipment (UE) radio transmission and reception (FDD)" (3GPP TR 25.101 version 8.15.0 Release 8); Oct. 2011.

ETSI TS 125 101; V9.8.0; "Universal Mobile Telecommunications System (UMTS); User Equipment (UE) radio transmission and reception (FDD)" (3GPP TR 25.101 version 9.8.0 Release 9); Oct. 2011.

ETSI TS 125 101; V10.8.0; "Universal Mobile Telecommunications System (UMTS); User Equipment (UE) radio transmission and reception (FDD)" (3GPP TR 25.101 version 10.8.0 Release 10); Feb. 2013.

ETSI TS 125 102; V6.13.0; "Universal Mobile Telecommunications System (UMTS); User Equipment (UE) radio transmission and reception (TDD)" (3GPP TR 25.102 version 6.13.0 Release 6); May 2011.

ETSI TS 125 102; V7.21.0; "Universal Mobile Telecommunications System (UMTS); User Equipment (UE) radio transmission and reception (TDD)" (3GPP TR 25.102 version 7.21.0 Release 7); Oct. 2011.

ETSI TS 125 102; V8.11.0; "Universal Mobile Telecommunications System (UMTS); User Equipment (UE) radio transmission and reception (TDD)" (3GPP TR 25.102 version 8.11.0 Release 8); Oct. 2011.

ETSI TS 125 102; V9.5.0; "Universal Mobile Telecommunications System (UMTS); User Equipment (UE) radio transmission and reception (TDD)" (3GPP TR 25.102 version 9.5.0 Release 9); Oct. 2011.

ETSI TS 125 102; V10.3.0; "Universal Mobile Telecommunications System (UMTS); User Equipment (UE) radio transmission and reception (TDD)" (3GPP TR 25.102 version 10.3.0 Release 10); Oct. 2011.

ETSI TS 125 308; V6.4.0; "Universal Mobile Telecommunications System (UMTS); High Speed Downlink Packet Access (HSDPA) Overall description; Stage 2" (3GPP TS 25.308 version 6.4.0 Release 6); Mar. 2007.

ETSI TS 125 308; V7.12.0; "Universal Mobile Telecommunications System (UMTS); High Speed Downlink Packet Access (HSDPA) Overall description; Stage 2" (3GPP TS 25.308 version 7.12.0 Release 7); Mar. 2011.

ETSI TS 125 308; V8.11.0; "Universal Mobile Telecommunications System (UMTS); High Speed Downlink Packet Access (HSDPA) Overall description; Stage 2" (3GPP TS 25.308 version 8.11.1 Release 8); Jan. 2012.

ETSI TS 125 308; V9.6.1; "Universal Mobile Telecommunications System (UMTS); High Speed Downlink Packet Access (HSDPA) Overall description; Stage 2" (3GPP TS 25.308 version 9.6.1 Release 9); Jan. 2012.

ETSI TS 125 308; V10.6.0; "Universal Mobile Telecommunications System (UMTS); High Speed Downlink Packet Access (HSDPA) Overall description; Stage 2" (3GPP TS 25.308 version 10.6.0 Release 10); Jan. 2012.

ETSI TS 141 101; V6.12.0; "Digital cellular telecommunications system (Phase 2+); Technical Specifications and Technical Reports for a GERAN-based 3GPP system" (3GPP TS 41.101 version 6.12.0 Release 6); Jan. 2010.

ETSI TS 141 101; V7.4.0; "Digital cellular telecommunications system (Phase 2+); Technical Specifications and Technical Reports for a GERAN-based 3GPP system" (3GPP TS 41.101 version 7.4.0 Release 7); Jan. 2010.

ETSI TS 141 101; V8.4.0; "Digital cellular telecommunications system (Phase 2+); Technical Specifications and Technical Reports for a GERAN-based 3GPP system" (3GPP TS 41.101 version 8.4.0 Release 8); Mar. 2012.

ETSI TS 141 101; V9.2.0; "Digital cellular telecommunications system (Phase 2+); Technical Specifications and Technical Reports for a GERAN-based 3GPP system" (3GPP TS 41.101 version 9.2.0 Release 9); Mar. 2012.

ETSI TS 141 101; V10.2.0; "Digital cellular telecommunications system (Phase 2+); Technical Specifications and Technical Reports for a GERAN-based 3GPP system" (3GPP TS 41.101 version 10.2.0 Release 10); Mar. 2012.

ETSI TS 144 060; V6.28.0; "Digital cellular telecommunications system (Phase 2+); General Packet Radio Service (GPRS); Mobile Station (MS)—Base Station system (BSS) interface; Radio Link Control/Medium Access Control (RLC/MAC) protocol" (3GPP TS 44.060 version 6.28.0 Release 6); Mar. 2010.

ETSI TS 144 060; V7.26.0; "Digital cellular telecommunications system (Phase 2+); General Packet Radio Service (GPRS); Mobile Station (MS)—Base Station system (BSS) interface; Radio Link

(56) References Cited

OTHER PUBLICATIONS

Control/Medium Access Control (RLC/MAC) protocol" (3GPP TS 44.060 version 7.26.0 Release 7); Mar. 2012.

ETSI TS 144 060; V8.16.0; "Digital cellular telecommunications system (Phase 2+); General Packet Radio Service (GPRS); Mobile Station (MS)—Base Station system (BSS) interface; Radio Link Control/Medium Access Control (RLC/MAC) protocol" (3GPP TS 44.060 version 8.16.0 Release 8); Jul. 2012.

ETSI TS 144 060; V9.12.0; "Digital cellular telecommunications system (Phase 2+); General Packet Radio Service (GPRS); Mobile Station (MS)—Base Station system (BSS) interface; Radio Link Control/Medium Access Control (RLC/MAC) protocol" (3GPP TS 44.060 version 9.12.0 Release 9); Jul. 2012.

ETSI TS 144 060; V10.9.0; "Digital cellular telecommunications system (Phase 2+); General Packet Radio Service (GPRS); Mobile Station (MS)—Base Station system (BSS) interface; Radio Link Control/Medium Access Control (RLC/MAC) protocol" (3GPP TS 44.060 version 10.9.0 Release 10); Jul. 2012.

* cited by examiner

```
<MgmtTree
xmlns:MSFT="http://schemas.microsoft.com/Mobile
Device/DM">
<VerDTD>1.2</VerDTD>
<Node>
  <NodeName>DataRecovery</NodeName>
  <Path>.<Path>
  <DFProperties>
    <AccessType><Get/></AccessType>
    <DFFormat><node/></DFFormat>
    <Occurrence><One/></Occurrence>
    <Scope><Permanent/></Scope>
    <Description></Description>
  </DFProperties>
  <Node>
    <NodeName>All</NodeName>
    <DFProperties>
        <AccessType><Get/><Exec/></AccessType>
        <DFFormat><node/></DFFormat>
        <Occurrence><One /></Occurrence>
        <Scope><Dynamic /></Scope>
        <Description></Description>
    </DFProperties>
  </Node>
  <Node>
    <NodeName>Documents</NodeName>
    <DFProperties>
        <AccessType><Get /><Exec /></AccessType>
        <DFFormat><node /></DFFormat>
        <Occurrence><One /></Occurrence>
        <Scope><Dynamic /></Scope>
        <Description></Description>
    </DFProperties>
  </Node>
  <Node>
   <NodeName>Media</NodeName>
    <DFProperties>
     <AccessType><Get /></AccessType>
     <DFFormat><node /></DFFormat>
     <Occurrence><One /></Occurrence>
     <Scope><Dynamic /></Scope>
     <DFType><MIME>text/plain</MIME></DFType>
    <Node>
     <NodeName>Pictures</NodeName>
      <DFProperties>
        <AccessType><Exec /><Get /></AccessType>
        <DFFormat><node /></DFFormat>
        <Occurrence><One /></Occurrence>
        <Scope><Dynamic /></Scope>
        <DFType><MIME>text/plain</MIME></DFType>
      </DFProperties>
   </Node>
   <Node>
    <NodeName>Audio</NodeName>
     <DFProperties>
       <AccessType><Exec /><Get /></AccessType>
       <DFFormat><node /></DFFormat>
     <Occurrence><One /></Occurrence>
       <Scope><Dynamic /></Scope>
       <DFType><MIME>text/plain</MIME></DFType>
     </DFProperties>
   </Node>
Continued....
```

```
<Node><NodeName>Video</NodeName>
 <DFProperties>
 <AccessType><Exec /><Get /></AccessType>
 <DFFormat><node/></DFFormat>
 <Occurrence><One/></Occurrence>
 <Scope><Dynamic /></Scope>
 <DFType><MIME>text/plain</MIME></DFType>
 </DFProperties>
</Node>
<Node><NodeName>PIM</NodeName>
 <DFProperties>
 <AccessType><Get/></AccessType>
 <DFFormat><node/></DFFormat>
 <Occurrence><One /></Occurrence>
 <Scope><Dynamic /></Scope>
 <DFType><MIME>text/plain</MIME></DFType>
<Node><NodeName>SMS</NodeName>
 <DFProperties>
 <AccessType><Exec /><Get /></AccessType>
 <DFFormat><node /></DFFormat>
 <Occurrence><One /></Occurrence>
 <Scope><Dynamic /></Scope>
 <DFType><MIME>text/plain</MIME></DFType>
 </DFProperties>
</Node>
<Node><NodeName>MMS</NodeName>
 <DFProperties>
 <AccessType><Exec /><Get /></AccessType>
 <DFFormat><node /></DFFormat>
 <Occurrence><One /></Occurrence>
 <Scope><Dynamic /></Scope>
 <DFType><MIME>text/plain</MIME></DFType>
 </DFProperties>
</Node>
<Node><NodeName>EMS</NodeName>
 <DFProperties>
 <AccessType><Exec /><Get /></AccessType>
 <DFFormat><node /></DFFormat>
 <Occurrence><One /></Occurrence>
 <Scope><Dynamic /></Scope>
 <DFType><MIME>text/plain</MIME></DFType>
 </DFProperties>
</Node>
<Node><NodeName>EMAIL</NodeName>
 <DFProperties>
 <AccessType><Exec /><Get /></AccessType>
 <DFFormat><node /></DFFormat>
 <Occurrence><One /></Occurrence>
 <Scope><Dynamic /></Scope>
 <DFType><MIME>text/plain</MIME></DFType>
 </DFProperties>
</Node>
</Node>
<<Node><NodeName>Ext</NodeName>
 <DFProperties>
 <AccessType><Exec /><Get /></AccessType>
 <DFFormat><node /></DFFormat>
 <Occurrence><One /></Occurrence>
 <Scope><Dynamic /></Scope>
 <DFType><MIME>text/plain</MIME></DFType>
 </DFProperties>
</Node>
</Node>
</MgmtTree>
```

FIG.5

DEVICE MANAGEMENT METHOD, SERVER AND SYSTEM AND MOBILE EQUIPMENT

CROSS-REFERENCE TO RELATED APPLICATION(S) AND CLAIM OF PRIORITY

The present application is related to and claims priority under 35 U.S.C. §119(a) to a Indian Patent Application filed in the Indian Patent Office on Jul. 6, 2012 and assigned Serial No. 2746/CHE/2012, the contents of which is incorporated herein by reference.

TECHNICAL FIELD

The present disclosure relates to a device management method and apparatus, and more particularly to a device management method and apparatus using an open mobile alliance (OMA) device management (DM) protocol.

BACKGROUND

Mobile equipment (ME) is popular with everybody irrespective of any socioeconomic background. Today the mobile equipment does not merely serve communication purpose but with advanced processors and better memory management is becoming a pocket-able private information database which contains various user data and enterprise related data. The ME can contain confidential information and organizational secrets.

During some accidental data deletion, software or hardware malfunction results in loss of data which is an unfavorable situation for the user. Moreover, if the ME is lost or stolen, there is a risk of data being compromised either maliciously or by accident. In such situations recovering lost data as well as locking ME is critical. The user of ME expects data recovery and device locking to be done as fast as possible. The user may intend to recover the data by contacting the service provider of the ME and the service provider will recover the data from the ME. Also, if the user intends to lock the lost ME, the user will contact the service provider to lock the ME. Moreover remote ME locking function can be accomplished by a service provider, only for those ME's which are registered with that particular service provider.

OMA is the leading industry forum for developing market-driven, interoperable mobile service enablers. Open Mobile Alliance Device Management (OMA DM) is a device management specification. By conforming to OMA DM, users, wireless operators, service providers, and corporate information management departments can eliminate the complication of various proprietary protocols. Device management pertains to configurations, provisioning client applications, and detecting problems of remote devices from servers. The service provider has the DM servers to recover and lock the ME if the ME was stolen or lost.

Due to above mentioned reasons, the existing system fails to recover data or lock the ME which is registered with a different service provider. There is a need for a system which can remotely recover data and lock ME irrespective of the service provider to which the ME is attached.

SUMMARY

To address the above-discussed deficiencies of the prior art, it is a primary object to is to provide a method and system to manage an ME registered with a different service provider.

Another object of the disclosure is to provide a method and system for a service provider to recover data from the ME registered with a different service provider.

Another object of the disclosure is to provide a method and system for a service provider to remotely lock the ME registered with a different service provider.

According to an aspect of the disclosure, there is provided a method for a Device Management (DM) server to manage a device by using an Open Mobile Alliance (OMA) Device Management (DM) protocol, the method comprising: broadcasting a query command on an Mobile Equipment (ME), which is not identified in a first list including identification details of at least one ME connected to a communication network where the DM server is included, to at least one other DM server present in at least one other communication network, based on a second list of addresses of the at least one other DM server; and performing at least one action on the identified ME through the other DM server having identified the ME, when one of the at least one other DM server identifies the ME.

According to another aspect of the disclosure, there is provided a Device management (DM) server for managing a device by using an Open Mobile Alliance (OMA) Device management (DM) protocol, the DM server comprising: a memory configured to store a first list including identification details of at least one ME (Mobile Equipment) connected to a communication network where the DM server is included, and store a second list of addresses of the at least one other DM server present in at least one other communication network; and a processing unit configured to broadcast a query command on an ME, which is not identified in the first list, to the at least one other DM server, based on the second list, and performs at least one action on the ME through the other DM server having identified the ME, when one of the at least one other DM server identifies the ME.

According to yet another aspect of the disclosure, there is provided a system for managing a device by using an Open Mobile Alliance (OMA) Device Management (DM) protocol, the system comprising: at least one DM server that is included in one communication network, is connected to at least one other DM server present in at least one other communication network, includes a first list including identification details of at least one Mobile Equipment (ME) connected to the communication network, includes a second list of addresses of the at least one other DM server, broadcasts a query command on an ME, which is not identified in the first list, to the at least one other DM server, based on the second list, and performs at least one action on the ME through the other DM server having identified the ME, when one of the at least one other DM server identifies the ME.

According to still yet another aspect of the disclosure, there is provided an ME (Mobile Equipment) in a communication network, the ME comprising: a memory configured to store data; and a processing unit configured to invoke a data recovery management object (DRMO) upon receiving data recovery commands from a DM server; process the commands sequentially; and invoke an upload agent to retrieve data and to transfers the data to the DM server.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates DRMO device description framework (DDF) according to embodiments as disclosed herein;

DETAILED DESCRIPTION

Figure 1:
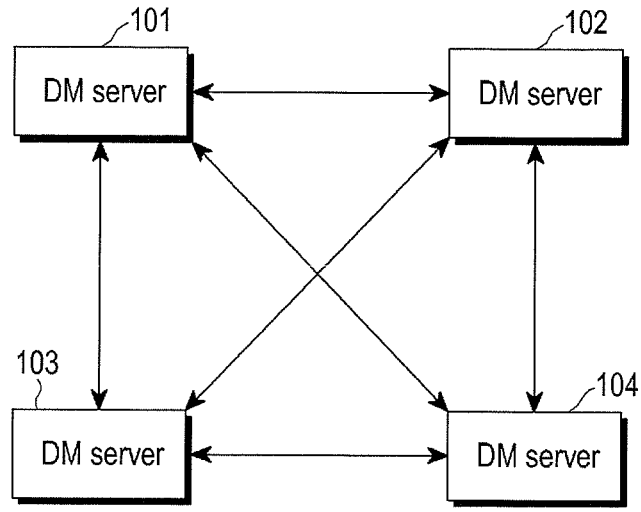
FIG. 1 illustrates a unified DM server network system according to embodiments as disclosed herein.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein make it possible to remotely manage the ME irrespective of the service provider to which the ME is registered. The embodiments propose a unified DM server network system where DM servers of all the service providers are inter-connected to enable intercommunication. Thus, the embodiments identify to which service provider the ME is connected and then any service provider can remotely manage the ME to recover data or to lock the ME upon receiving request from the user.

In an embodiment, the method and system described is based on OMA DM v1.2 protocol and OMA DM version 1.2 which is compatible with both Global System for Mobile communication (GSM) and Code Division Multiple Access (CDMA) networks, and is backward compatible with the OMA DM version 1.1.2 server.

Referring now to the drawings, and more particularly to FIGS. 1 through 10, where similar reference characters denote corresponding features consistently throughout the figures, there are shown preferred embodiments.

FIG. 1 illustrates a unified DM server network system, according to embodiments as disclosed herein. As depicted in the FIG. 1, the intercommunication between DM servers of communication networks of different service providers enables interoperable DM servers. A Unified DM server network system can have any number of DM servers which together behave as a single functional entity. The unified DM server network system comprises a DM server 101, a DM server 102, a DM server 103 and a DM server 104 which intercommunicate with each other by exchanging a set of messages securely over a standard transport protocol for inter-DM server communication. The standardization body for unified DM server network system can decide the secure transport protocol to be used for inter-DM server communications. In an embodiment, the standardization body can be OMA which decides the secure communication to be Hypertext Transfer Protocol Secure (HTTPS) or Secure Sockets Layer (SSL) for communication between DM servers.

Each of the DM servers in the unified DM server network system maintains a list of identification details for each ME registered therewith. In an embodiment of the disclosure, the list of identification details of each ME may be a list of International Mobile Equipment (IMEI) and International Mobile Subscriber Identity (IMSI) pair or one of IMEI and IMSI. Each DM server also maintains a list of addresses of all other DM servers operating in unified DM server network system. In an embodiment, the list of addresses can be IP (Internet Protocol) address or host name or URL (Uniform Resource Locator). This enables each DM server to obtain the information about inter-connected DM servers and communicate with all other DM servers in the unified DM server network system. This enables any service provider in the unified DM server network to identify a particular ME registered with any service provider and remotely manage this ME.

Figure 2:
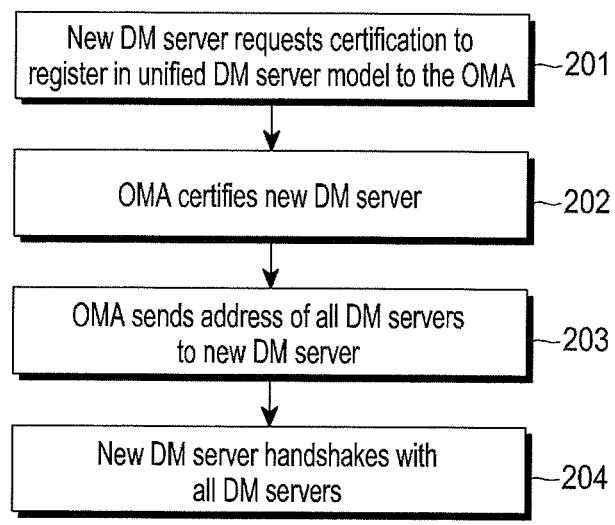
FIG. 2 illustrates a process of new DM server registration to the unified DM server network system, according to embodiments as disclosed herein.

FIG. 2 illustrates the process of new DM server registration to the unified DM server network system, according to embodiments as disclosed herein. As depicted in the FIG. 2, a new DM server installed in the unified DM server network system requests (201) certification for registration in unified DM server network system to the OMA. OMA verifies the request to certify (202) the new DM server before being deployed in network. A list of existing DM servers in unified DM server network system can be obtained by the new DM server from the OMA. OMA maintains the list of addresses of all DM servers in the unified DM server network system. OMA sends (203) addresses of all DM servers to new DM server. Upon receiving the addresses of all DM servers the new DM server handshakes (204) or authenticates with all other DM servers and is deployed into unified DM server network. This authentication between new DM server and other existing DM servers in the network is accomplished by new DM server broadcasting a hello and ACK commands to all DM servers with help of address list the new DM server received from OMA, thereafter other DM servers respond to this hello with an acknowledgement. The new DM server shares the DM server's identification details such as host name or IP address and becomes a part of unified DM server network system. The new DM server can intercommunicate with all other DM servers in unified DM server network system and offer interoperable DM services. After registration, the new DM server can perform interoperable DM operations. In order to start the interoperable DM operations, a DM server may first identify the other service provider DM server to which a ME is subscribed or registered. The various actions in FIG. 2 may be performed in the order presented, in a different order or simultaneously. Further, in some embodiments, some actions listed in FIG. 2 may be omitted.

Figure 3:
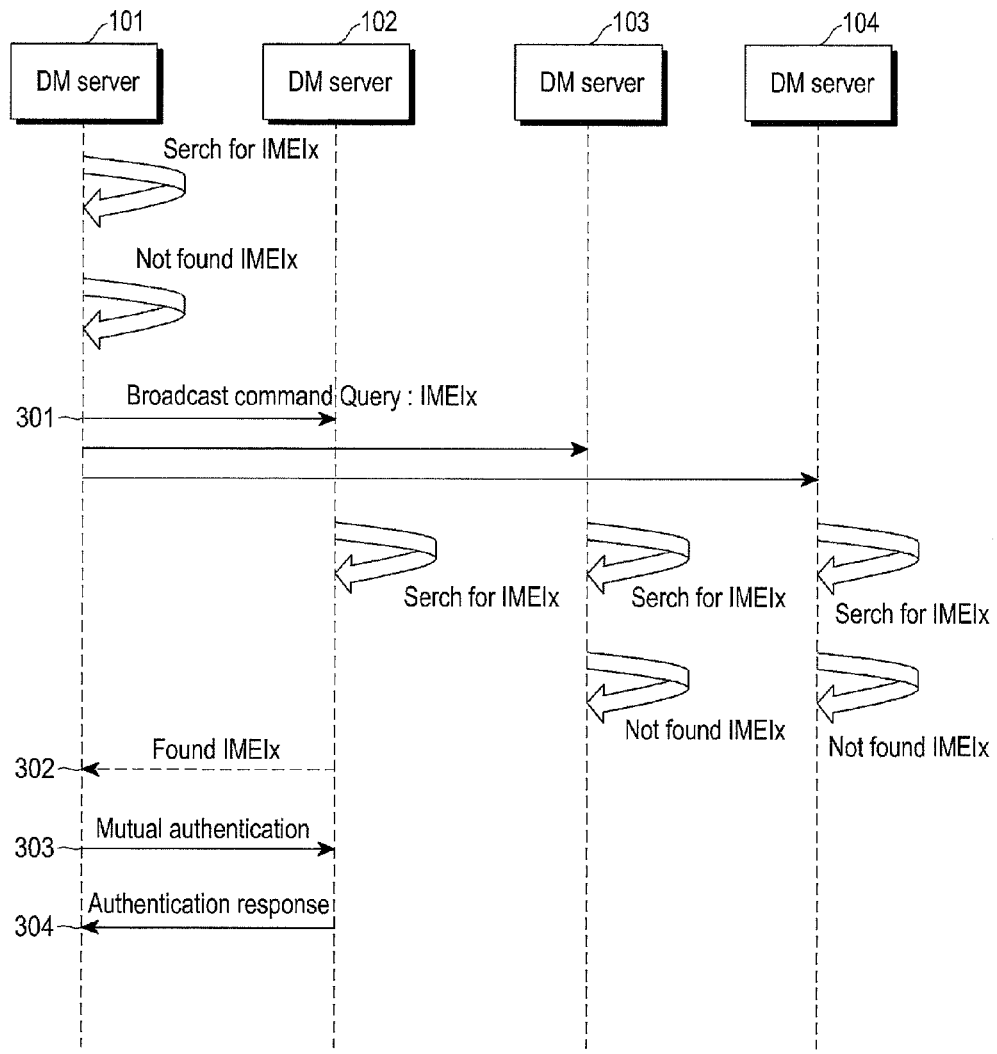
FIG. 3 illustrates a sequence diagram to identify ME with IMEIx connected with a DM server in a unified DM server network system, according to embodiments as disclosed herein.

FIG. 3 illustrates a sequence diagram to identify ME with IMEIx connected with a DM server in a unified DM server network system, according to embodiments as disclosed herein. As used herein, the IMEIx represents, for example, an IMEI that any ME has. As depicted in the FIG. 3, the unified DM server network system comprises of DM server 101, DM server 102, DM server 103 and DM server 104 of different service providers. These DM servers communicate with each other to identify a ME with IMEIx, in the network. Service provider receives a request from a user to identify the stolen ME. Then the service provider requests the service provider's DM server 101 to identify the user's lost ME having IMEIx. DM Server 101 performs a search to identify the DM server to which a ME with IMEIx is currently registered. DM Server 101 initially performs a search for IMEIx in the DM Server's 101 own list of [IMEI, IMSI] pairs to check whether the IMEIx is registered with it. If a match is found, the ME is identified to be attached to DM Server 101 itself. If there is no match found within DM Server's 101 own list, DM Server 101 broadcasts (301) a query command (QUERY: IMEIx) to all the DM servers in DM Server's 101 list.

DM server 102, DM server 103 and DM server 104 who receive this query command (QUERY: IMEIx) from DM server 101 search for IMEIx in their list of [IMEI, IMSI] pairs. If any DM server finds a match that DM server responds to DM server 101 with an acknowledgement. In an embodiment, a user loses his ME and complains to his service provider. But the Subscriber Identity Module (SIM) initially in the ME is replaced with some other SIM of a different service provider. In this exemplary embodiment, the service provider providing services to the initial SIM may not be able to manage the ME since the SIM has been replaced with another SIM of a different service provider. In an example herein, the lost ME is currently registered to DM server 102. DM server 102, DM server 103 and DM server 104 search for the IMEIx in their respective list. DM sever 103, DM server 104 do not find a match but DM server 102 identifies ME with IMEIx in DM server's 102 list and intimates (302) DM server 101 by sending a message to DM server 101. DM server 101 requests (303) mutual authentication to DM server 102. DM server 102 responds (304) to the authentication received from DM server 101. In an embodiment, the authentication process can be performed by handshaking between the DM server 101 and 102 to make sure that DM server 102 is a trusted entity which is already registered in Unified DM server network system.

Thus the unified DM server network system facilitates in identifying ME with IMEIx which is currently connected to a different service provider's DM server.

Figure 4:
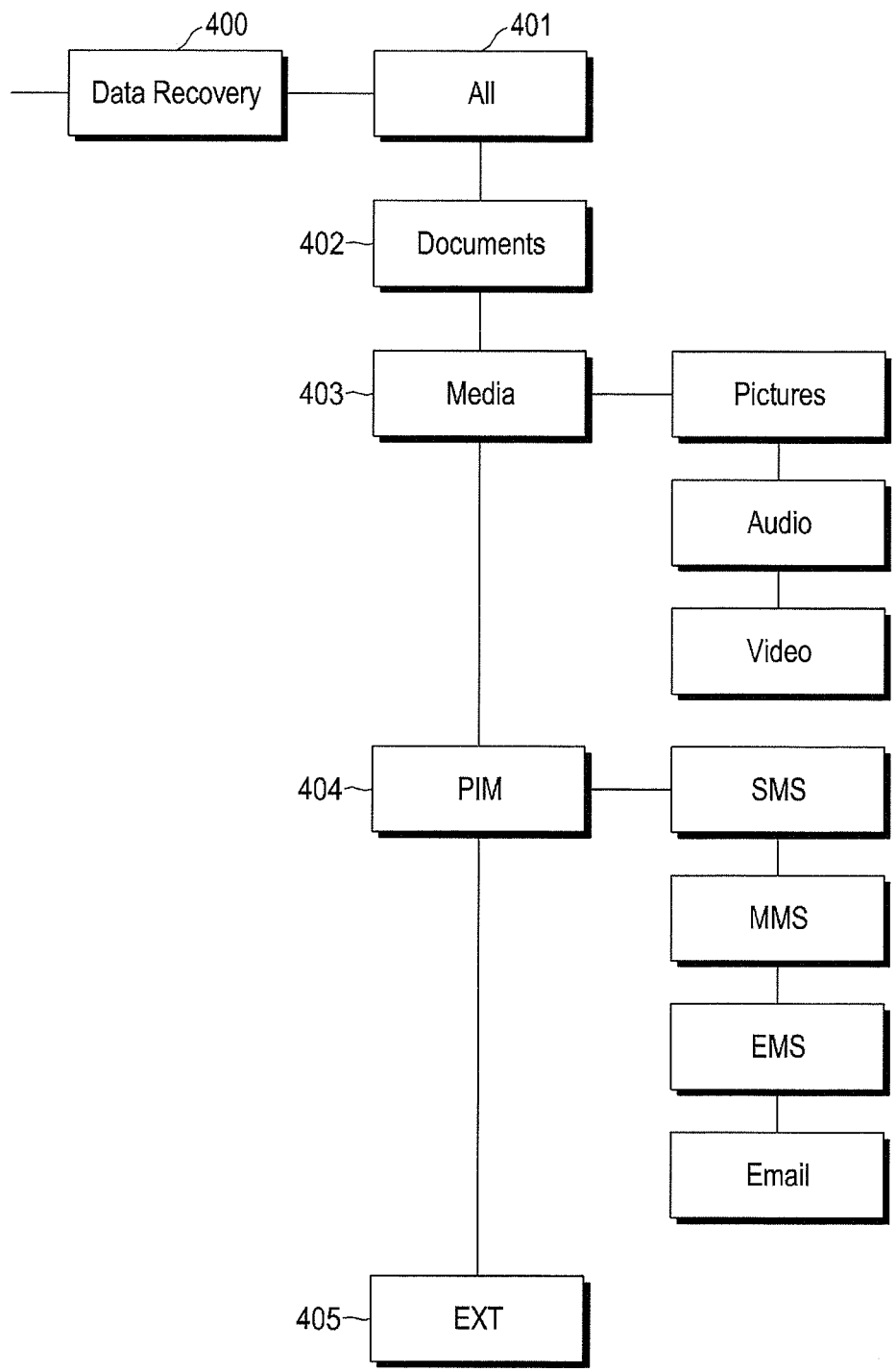
FIG. 4 illustrates a Data Recovery Management Object (DRMO) DM tree according to embodiments as disclosed herein.

FIG. 4 illustrates a Data Recovery Management Object (DRMO) DM tree, according to embodiments as disclosed herein. DRMO allows mobile service providers to remotely recover data from a ME, over OMA DM protocol. Referring to FIG. 4, the DRMO DM tree has Data recovery node 400 as root node with the leaf nodes All 401, Documents 402, Media 403, Personal information Manager (PIM) 404 and Extension (EXT) 405. The leaf nodes of DRMO DM tree are supported only with Exec DM command. The parameters or the nodes defined in the DM tree cannot be manipulated by the client or the server, but can be queried and set by the DM servers using OMA DM commands. The DM tree structure enables to choose or specify the information to be recovered from the ME. DRMO provides various commands which include root node data recovery 400 along with other leaf nodes to recover the desired data from the ME.

If user chooses to recover all possible information from his ME, then following LocURI can be used in Exec DM command.

./DataRecovery/All:

In the root node this All 401 leaf node specifies that the data represented by all leaf nodes and their sub nodes such as documents 402, media 403 (picture, video, audio files), PIM 404 (Short Message Service (SMS), Enhanced Message Service (EMS), Multi-media Message Service (MMS), Email) should be recovered.

Other LocURI which can be used for respective data recovery function are given below.

./DataRecovery/Documents:

In the root node, this node specifies that all documents present in ME's local and external storage should be recovered.

./DataRecovery/Media/Pictures:

This node specifies that all pictures present in ME's local and external storage should be recovered. To recover only specific information of picture files defined in sub leaf node of leaf node media 403, this LocURI should be executed.

./DataRecovery/Media/Audio:

This node specifies that all audio files present in ME's local and external storage should be recovered.

./DataRecovery/Media/Video:

This node specifies that all video files present in ME's local and external storage should be recovered.

./DataRecovery/PIM/Contacts:

This node specifies that all the PIM and phonebook contacts present in the ME should be recovered. The leaf node PIM 404 refers to PIM of user and helps to recover information related to SMS, EMS, MMS, and Email as defined in the DM tree. If a contact sub leaf node for DM tree was defined under PIM 404 then this LocURI can be used in Exec DM command to recover contact details in phonebook and SIM card.

./DataRecovery/PIM/Appointments:

This node specifies that all the calendar events, appointments and reminders present in the ME should be recovered.

./DataRecovery/PIM/Messages/SMS:

This node specifies that all the SMS messages present in the ME should be recovered.

./DataRecovery/PIM/Messages/MMS:

This node specifies that all the multimedia messages (MMS) present in the ME should be recovered.

./DataRecovery/PIM/Messages/EMS:

This node specifies that all the enhanced messages (EMS) present in the ME should be recovered.

./DataRecovery/PIM/Messages/Email:

This node specifies that all the email messages present in the ME will be recovered.

./DataRecovery/Ext

This is an interior node provided for Original Equipment manufacturer (OEM) and service providers to add multiple other data recovery settings as leaf nodes, thereby providing extensible DRMO.

In an embodiment, if the user wishes to recover only the audio content for his ME. Then the following DM command may be executed.

```
<Exec>
   <CmdID>1</CmdID>
   <Item>
     <Target>
     <LocURI>./DataRecovery/Media/Audio</LocURI>
     </Target>
        </Item>
</Exec>
```

FIG. 5 illustrates DRMO device description framework (DDF), according to embodiments as disclosed herein. A DDF is adopted by the DM server for remote data recovery, over OMA DM protocol.

In an embodiment, the DRMO is not strictly coupled with the Unified DM server network system, instead once standardized; the DRMO can be even used by Non-Unified DM servers also.

Figure 6:
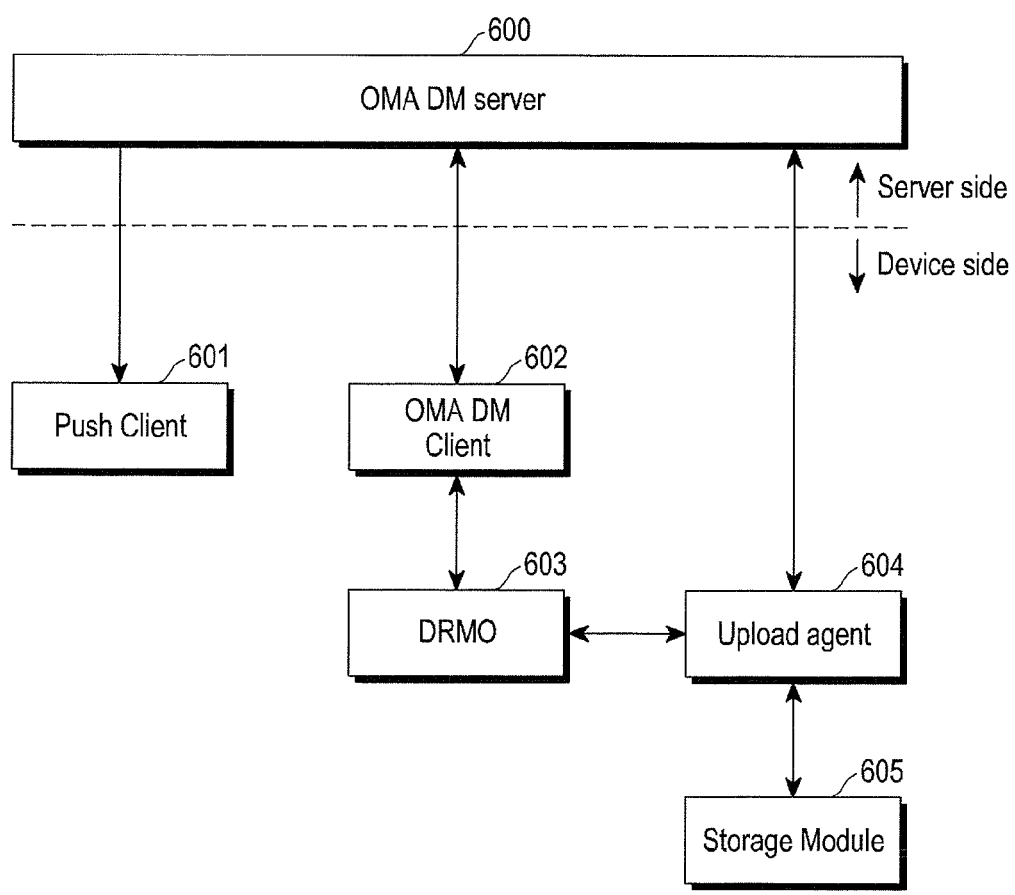
FIG. 6 illustrates an architectural diagram for data recovery using unified DM server network system according to embodiments as disclosed herein.

FIG. 6 illustrates an architectural diagram for data recovery using unified DM server network system, according to embodiments as disclosed herein. The unified DM server network system is a collaborated network of multiple OMA DM servers. The FIG. 6 depicts data recovery mechanism modules in an ME along with intercommunication among these modules, as well as communication between the ME and DM server to which ME is registered.

For example, a user's ME was stolen. Then the user of the ME with IMEIx requests his service provider to recover data from his stolen ME. The DM server of service provider is a part of network of the unified DM server network system. Upon receiving the user request the DM server broadcast a command with IMEI$_x$ to all the DM servers in the unified DM server network system. Then the OMA DM server 600 identifies that the lost ME is registered with itself. Then the OMA DM server 600 starts a data recovery operation from ME with IMEI$_x$. OMA DM server 600 then pushes the DM notification message over Wireless Application Protocol (WAP) Push SMS where WAP is a standard protocol to access information over mobile wireless network.

The DM notification message includes the OMA DM server 600 identification (server ID) and intimates ME with IMEIx to initiate a DM session with the OMA DM server 600. If ME with IMEIx does not currently have data connectivity with OMA DM server 600, then OMA DM server 600 enables data connectivity in ME to perform data recovery.

The push client 601 (according to an OMA DM standard) in the ME receives the DM Notification and passes the DM Notification to the OMA DM client 602 module in ME, which performs remote device management over OMA DM protocol and authenticates the OMA DM server 600 for further communication.

The OMA DM client 602 in the ME initiates a DM session by sending the device identity information with DevInfo MO. The OMA DM server 600 in response sends the Data Recovery command using DRMO to the ME. Then the OMA DM client 602 invokes the Data Recovery Management Object (DRMO) 603 in the ME, to perform the data recovery operation.

The DRMO 603 processes the DM commands one by one to identify the data to be recovered and invokes the upload agent 604 with the URL of OMA DM sever 600, for transportation of data to the OMA DM server 600.

Upload agent 604 in the ME performs data transportation function from the ME's storage module 605 to the OMA DM server over Hypertext Transfer Protocol (HTTP). Upload agent 604 retrieves the data according to processed commands of DRMO 603 from the ME's storage module 605 with local storage. In an embodiment upload agent 604 can retrieve data from ME's external storage.

All the data retrieved from the ME by the upload agent 604 is transferred securely over a protocol. In an embodiment data is transferred via HTTPS protocol to the OMA DM server 600. After completion of data transfer to OMA DM server 600, the upload agent 604 updates the completion status to the DRMO 603 which further sends the data recovery operation status to OMA DM client 602. The OMA DM client 602 sends the final status code in a new DM session to the OMA DM server 600 and closes the DM session.

If data connectivity was explicitly enabled during start of the recovery operation, then OMA DM server will disable the data connectivity and then close the DM session. OMA DM server 600 shares the recovered data from the ME with the DM server that initiated request.

Figure 7:
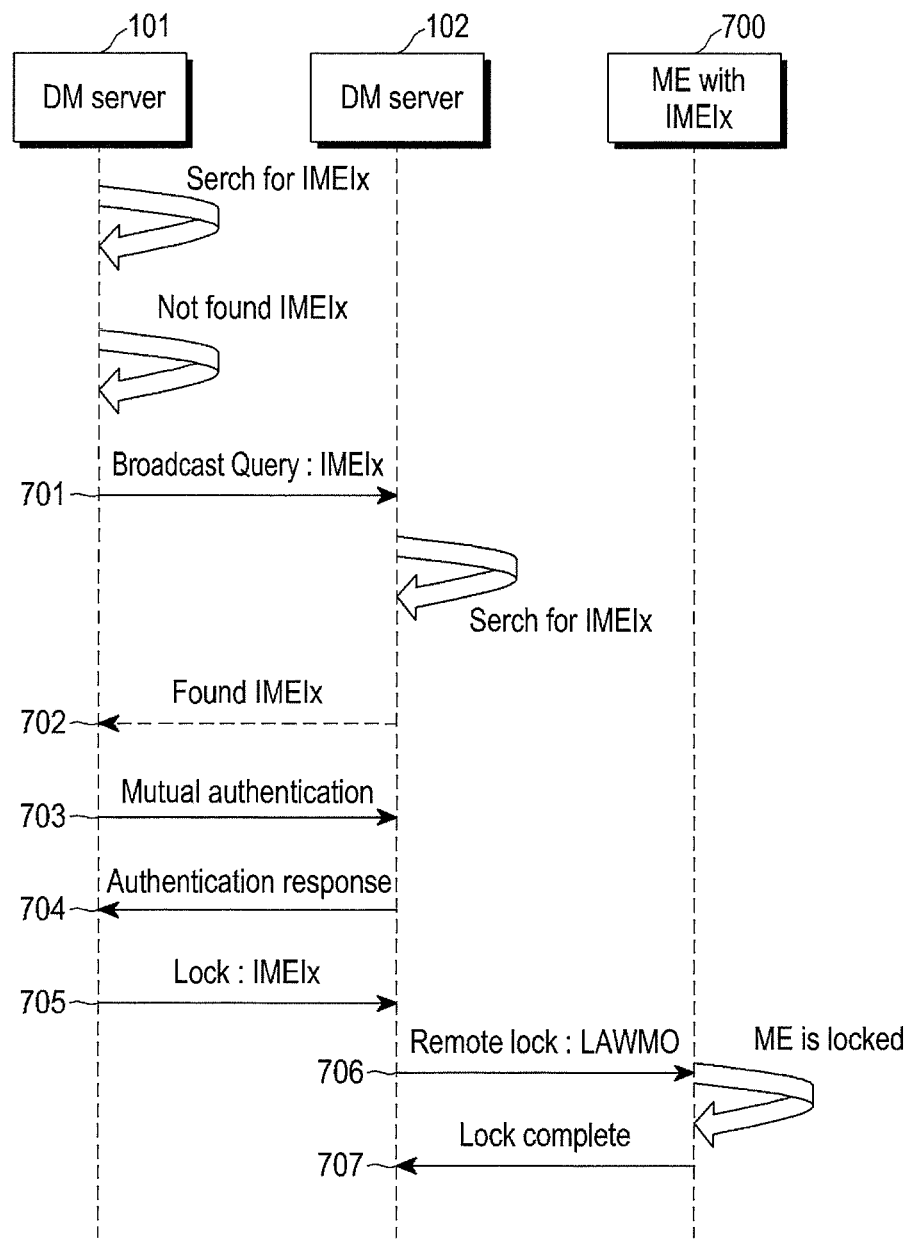
FIG. 7 illustrates a sequence diagram to remotely lock the ME with IMEIx according to embodiments as disclosed herein.

FIG. 7 illustrates a sequence diagram to remotely lock the ME with IMEIx, according to embodiments as disclosed herein. As depicted in the FIG. 7, the DM server 101 remotely locks ME 700 with IMEIx which is currently registered with a different service provider having DM server 102 in the unified DM server network system.

The remote lock request can be requested by a user (e.g., an owner of stolen or misplaced ME) of ME 700 to the registered service provider. In an example here the DM server 101 receives a request to lock ME 700. The DM server 101 upon receiving remote lock request from the user searches for ME with IMEIx in DM Server's 101 own list of IMEI, IMSI pairs. If an IMEIx match is found the DM server 101 will remotely lock the ME by sending a lock command using LAWMO (Lock and Wipe Management Object) command. LAWMO allows deactivation of the device over the network, giving operators an effective way to protect user and enterprise related data. Specific capabilities of the LAWMO include locking and unlocking the device, wiping the device data and remote factory reset.

If no IMEI$_x$ match is found then DM server 101 broadcasts (701) a query command (QUERY: IMEIx) to all the DM servers in the unified DM server network system. Then the DM server 102 upon receiving the command from DM server 101 performs a search in the list of ME's registered with the DM server 102. After performing the search, the DM server 102 identifies that the ME with $IMEI_x$ is currently connected with the DM server 102 and intimates (702) DM server 101 by sending a message to DM server 101. The DM server 101 then requests (703) mutual authentication to DM server 102 and DM server 102 sends (704) authentication response to the DM server 101. DM server 101 issues (705) a lock command (LOCK $IMEI_x$) to DM sever 102 requesting to lock the ME with $IMEI_x$. DM sever 102 remotely locks (706) the ME 700 by sending a lock command using LAWMO to the ME 700. With this lock command the ME 700 with $IMEI_x$ gets locked and then ME 700 sends (707) lock completed status to the DM server 102. Therefore, the ME with $IMEI_x$ is locked and unauthorized usage is prevented.

Remote locking is an Over the Air (OTA) feature to lock an ME over OMA Client Provisioning (OMA CP) or OMA device management (OMA DM) protocol. The OMA CP protocol covers WAP provisioning with minimal user interaction, typically over-the-air or via SIM Card. OMA DM specification is designed for management of small mobile devices such as mobile phones, Personal Digital Assistants (PDAs) and palm top computers. The device management is intended to support the following typical uses such as provisioning, configuration of mobile device, software upgrades for applications and system software, fault management.

Currently, a service provider can remotely lock only those MEs which are attached to the service provider whereas unified DM server network system enables advanced remote locking, where a service provider can lock a ME, connected with any other service provider.

Figure 8:
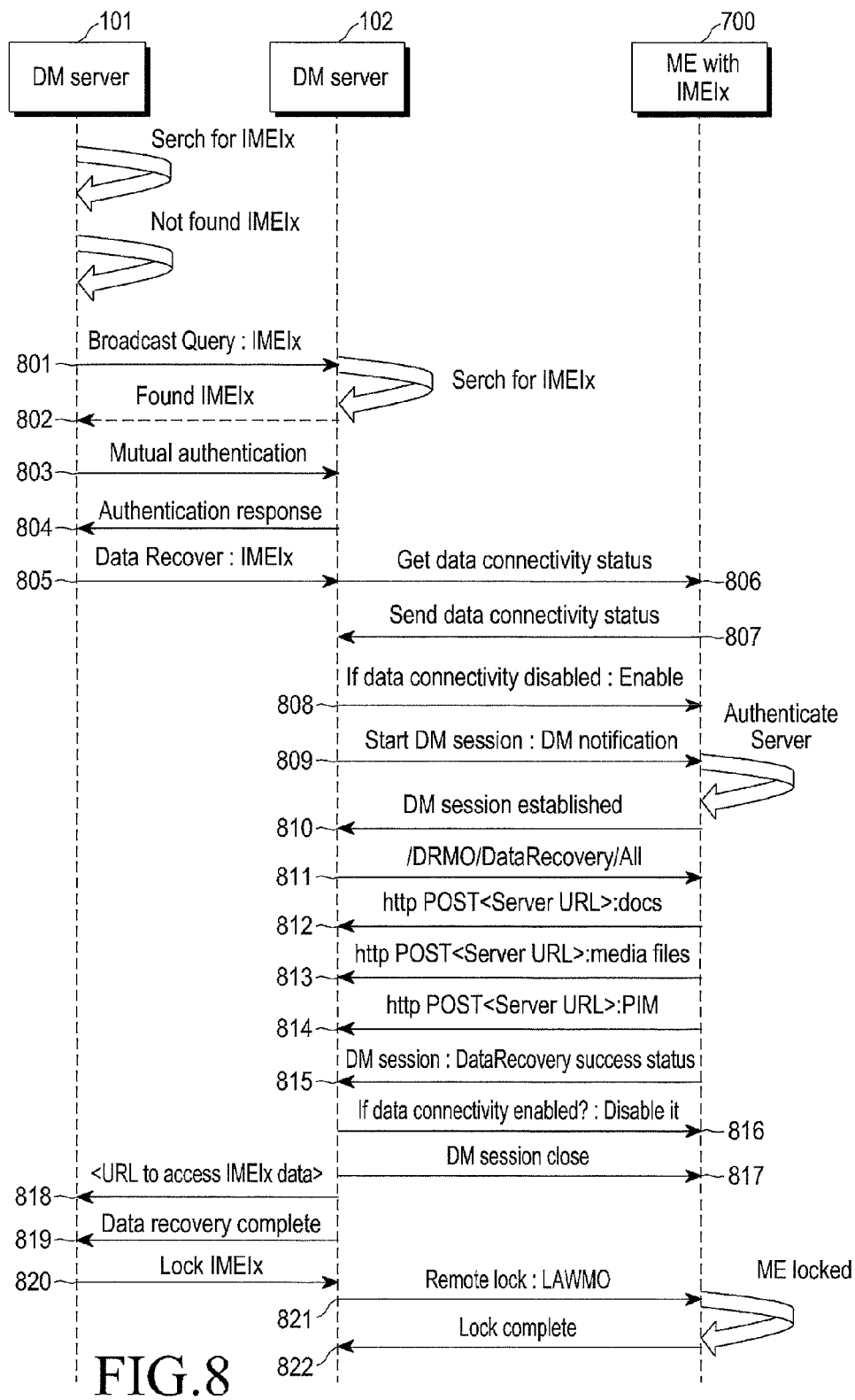
FIG. 8 illustrates a sequence diagram to recover data and lock the ME with IMEIx according to embodiments as disclosed herein.

FIG. 8 illustrates a sequence diagram to recover data and lock the ME with $IMEI_x$, according to embodiments as disclosed herein. FIG. 8 depicts the sequence of unified DM server network system with remote data recovery and remote locking of a ME. For example, a user of ME 700 with $IMEI_x$ requests his or her service provider with DM server 101 to recover data and secure his or her confidential details from his lost ME 700 and then lock the ME 700 to prevent any unauthorized usage.

Upon receiving the request from the user of ME 700, DM server 101 performs a search in DM Server's 101 own list of registered IMEI, IMSI pairs. If DM server 101 does not find any match for ME, 700 with $IMEI_x$ then DM server 101 broadcasts (801) a query command (QUERY: IMEIx) to all the DM servers in the unified DM server network system. Upon receiving the query command from the DM server 101, the DM server 102 performs a search to find whether the ME 700 with $IMEI_x$ is connected with the DM server 102. When DM server 102 finds that ME 700 with $IMEI_x$ is in DM Server's 102 own list of IMEI, IMSI pair. DM server 102 sends (802) a response to the DM server 101. The DM server 101 then requests (803) mutual authentication to DM server 102. On receiving the authentication the DM server 102 sends (804) authentication responses to the DM server 101. Then the DM server 101 sends (805) recover data command (DATARECOVER: IMEIx) to DM server 102. Upon receiving the recover data command, DM server 102 checks (806) the data connectivity status of ME 700. The ME 700 sends (807) the data connectivity status of the ME 700 to DM server 102. If data connectivity is not enabled, DM server 102 enables (808) data connectivity over the air using OMA CP. In an embodiment, the data connectivity may be enabled over General Packet Radio Service (GPRS) or High Speed Packet Access (HSPA) using OMA CP protocol.

GPRS is a packet-switching technology that enables data transfers through cellular networks. GPRS is used for mobile internet, MMS and other data communications. HSPA is an amalgamation of two mobile telephony protocols, High Speed Downlink Packet Access (HSDPA) and High Speed Uplink Packet Access (HSUPA) that extends and improves the performance of existing third generation (3G) mobile telecommunication networks utilizing the Wideband Code Division Multiple Access (WCDMA) protocols.

Upon enabling the data connectivity in the ME 700, DM server 102 starts (809) a DM session with ME 700 using DM notification over SMS. ME 700 authenticates DM server 102 and establishes (810) a DM session. DM server 102 then sends a series of DM commands to the ME with $IMEI_x$ for data recovery.

In an embodiment, the DM server 102 sends a command to recover (811) all data (/DRMO/DataRecovery/All) to ME 700. In response ME 700 sends (812) URL for document (http POST <Server URL>:docs), sends (813) URL for media files (http POST <Server URL>:media files), and sends (814) URL (http POST <Server URL>:PIM) for PIM to the DM server 102.

Further, ME 700 sends (815) data recovery operation success status to DM server 102. Upon receiving the success status from the ME 700, the DM server 102 disables (816) the data connectivity in ME 700 using OMA CP message, if the DM server 102 had explicitly enabled (808) the data connectivity at the start of data recovery operation and sends (817) session close indication to the ME 700. DM sever 101 then receives (818) the recovered data from DM server 102, which sends the URL of the location where the data recovered from ME 700 is stored. In an embodiment DM server 102 can directly transfer data contents to DM server 101. DM sever 102 then sends (819) acknowledgement to DM server 101 on completion of data recovery operation from ME 700. After receiving all the data from ME 700, DM server 101 sends (820) lock command (LOCK: $IMEI_x$) to DM server 102. Then the DM server 102 sends (821) an advanced remote lock command, LAWMO to remotely lock the ME 700. The ME is locked and becomes unusable. The ME 700 finally sends (822) a lock complete status to the DM server 102. Thus both the data recovery and locking operation is completed.

Figure 9:
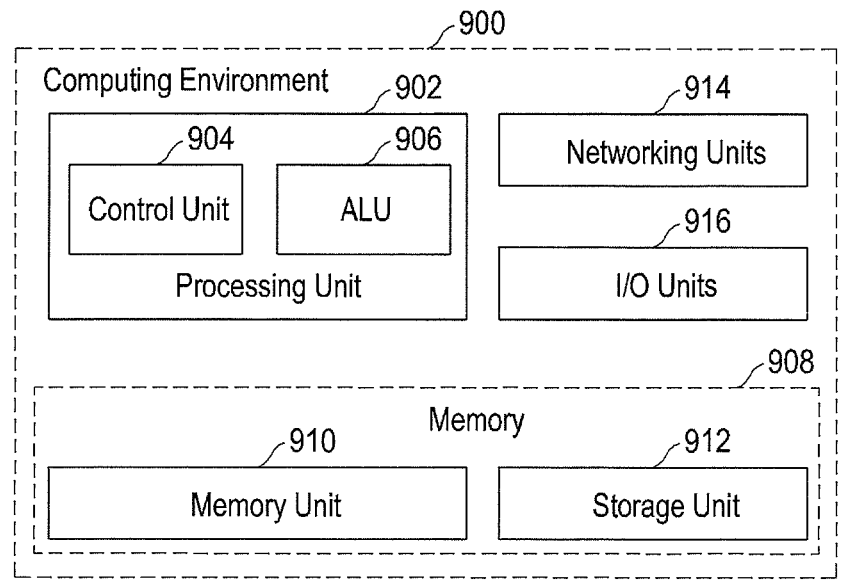
FIG. 9 illustrates a computing environment of the DM server which may be used in implementing various embodiments of the present disclosure.

FIG. 9 illustrates a computing environment 900 of the DM server, according to embodiments disclosed herein. The computing environment 900 illustrates one exemplary embodiment of the DM server 101, 102, 103, and 104. As depicted the computing environment 900 comprises at least one processing unit 902 that is equipped with a control unit 904 and an Arithmetic Logic Unit (ALU) 906, a memory 908 that is equipped with a memory unit 910 and a storage unit 912, plurality of networking, units 914, and a plurality Input output (I/O) units 916. The processing unit 902 is responsible for processing the instructions of the algorithm. The processing unit 902 receives commands from the control unit 904 in order to perform processing. Further, any logical and arithmetic operations involved in the execution of the instructions are computed with the help of the ALU 906.

The overall computing environment 900 can be composed of multiple homogeneous and/or heterogeneous cores, multiple Central Processing Units (CPUs) of different kinds, special media and other accelerators. Further, the plurality of processing units 902 may be located on a single chip or over multiple chips.

The algorithm comprising of instructions and codes required for the implementation are stored in either the memory unit 910 or the storage unit 912 or both. At the time of execution, the instructions may be fetched from the corresponding memory unit 910 and/or storage unit 912, and executed by the processing unit 902.

In embodiments including any hardware implementations various networking devices or external I/O devices may be connected to the computing environment 900 to support the implementation through the networking unit 914 and the I/O unit 916.

The memory 908 stores a first list including identification details of all MEs connected to a communication network to which one DM server belongs, and stores a second list of addresses of all other DM servers present in different communication networks. The identification details of the MEs may include at least one of IMEI and IMSI. The addresses of the other DM servers may include at least one of an IP address, a host name, and a URL.

The processing unit 902 broadcasts a query command on an ME 700, which is not identified in the first list, to other DM servers, based on the second list. When one of the other DM servers identifies the ME 700, the processing unit 902 performs at least one action on the ME 700 through the DM server having identified the ME 700. Upon receiving a query command (QUERY: IMEIx) broadcasted by a other DM server, the processing unit 902 search for the ME 700 according to the received query command in the first list. When the ME 700 according to the received query command is identified in the first list, the processing unit 902 informs the other DM server having broadcasted the query command of the identification of the ME 700. The processing unit 902 performs at least one action on the ME 700 according to a command received from the DM server having broadcasted the query command. The at least one action includes at least one of data recovery in the ME 700 and locking in the ME 700.

Figure 10:
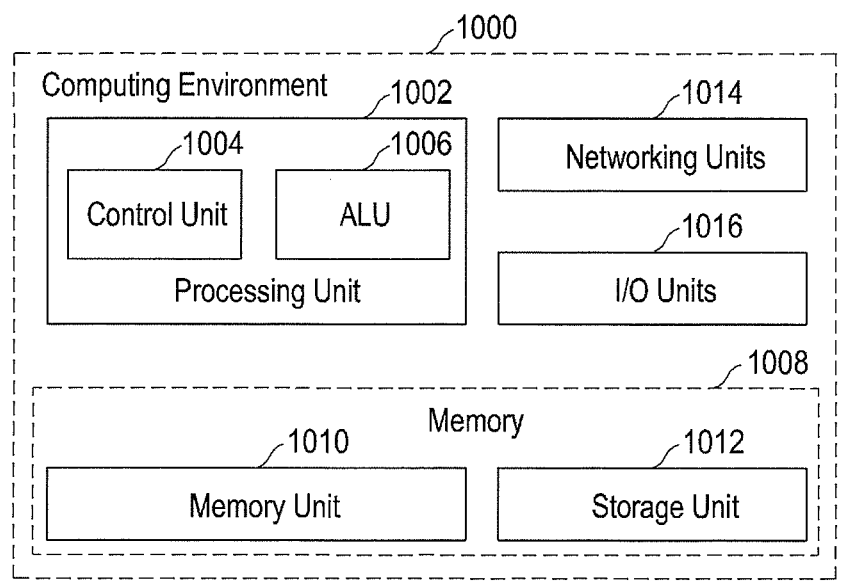
FIG. 10 illustrates a computing environment of the ME which may be used in implementing various embodiments of the present disclosure.

FIG. 10 illustrates a computing environment 1000 of the ME, according to embodiments disclosed herein. The computing environment 1000 illustrates one exemplary embodiment of the ME 700. As depicted the computing environment 1000 comprises at least one processing unit 1002 that is equipped with a control unit 1004 and an Arithmetic Logic Unit (ALU) 1006, a memory 1008 that is equipped with a memory unit 1010 and a storage unit 1012, plurality of networking units 1014, and a plurality Input output (I/O) units 1016. The processing unit 1002 is responsible for processing the instructions of the algorithm. The processing unit 1002 receives commands from the control unit 1004 in order to perform processing. Further, any logical and arithmetic operations involved in the execution of the instructions are computed with the help of the ALU 906.

The overall computing environment 1000 can be composed of multiple homogeneous and/or heterogeneous cores, multiple Central Processing Units (CPUs) of different kinds, special media and other accelerators. Further, the plurality of processing units 1002 may be located on a single chip or over multiple chips.

The algorithm comprising of instructions and codes required for the implementation are stored in either the memory unit 1010 or the storage unit 1012 or both. At the time of execution, the instructions may be fetched from the corresponding memory unit 1010 and/or storage unit 1012, and executed by the processing unit 1002.

In embodiments including any hardware implementations various networking devices or external I/O devices may be connected to the computing environment 1000 to support the implementation through the networking unit 1014 and the I/O unit 016.

Upon receiving data recovery commands from the DM server, the processing unit 1002 invokes the DRMO 603 to process the data recovery commands one by one, invokes the upload agent 604 to retrieve data from the memory 1010, and transfers the retrieved data to the DM server. In an embodiment of the disclosure, the upload agent 604 may retrieve data from at least one of a local storage or an external storage of the ME. Upon receiving a locking command from the DM server, the processing unit 1002 locks the ME 700.

The embodiments disclosed herein can be implemented through at least one software program running on at least one hardware device and performing network management functions to control the elements. The elements shown in FIGS. 1, 6, 9 and 10 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a Device Management (DM) server to manage a device by using an Open Mobile Alliance (OMA) Device Management (DM) protocol, the method comprising:
   broadcasting a query command on a Mobile Equipment (ME), which is not identified in a first list including identification details of at least one ME connected to a communication network where the DM server is included, to at least one other DM server present in at least one other communication network, based on a second list of addresses of the at least one other DM server; and
   performing at least one action on the identified ME through the other DM server having identified the ME, when one of the at least one other DM server identifies the ME.

2. The method as claimed in claim 1, wherein the identification details of the at least one ME comprises at least one of an International Mobile Equipment Identity (IMEI) and an International Mobile Subscriber Identity (IMSI).

3. The method as claimed in claim 1, wherein the addresses of the at least one other DM server comprises at least one of an LP (Internet Protocol) address, a host name, and a Uniform Resource Locator (URL).

4. The method as claimed in claim 1, further comprising:
   searching for the ME according to the received query command in the first list upon receiving the query command broadcasted by the at least one other DM server;
   informing the at least one other DM server having broadcasted the query command of identification of the ME, when the ME according to the received query command is identified; and performing at least one action on the identified the ME according to a command received from the at least one other DM server having broadcasted the query command.

5. The method as claimed in claim 4, wherein the at least one action comprises at least one of data recovery in the ME and locking in the ME.

6. The method as claimed in claim 1, wherein the least one action comprises at least one of data recovery in the ME and locking in the ME.

7. The method as claimed in claim 6, further comprising sending a data recovery command to the other DM server having identified the ME so that the other DM server having identified the ME performs the data recovery in the ME.

8. The method as claimed in claim 6, further comprising sending a locking command to the other DM server having identified the ME so that the other DM server having identified the ME performs the locking in the ME.

9. A Device management (DM) server for managing a device by using an Open Mobile Alliance (OMA) Device management (DM) protocol, the DM server comprising:
   a memory configured to store a first list including identification details of at least one ME (Mobile Equipment) connected to a communication network where the DM server is included, and store a second list of addresses of the at least one other DM server present in at least one other communication network; and
   a processing unit configured to broadcast a query command on an ME, which is not identified in the first list, to the at least one other DM server, based on the second list, and perform at least one action on the ME through the other DM server having identified the ME, when one of the at least one other DM server identifies the ME.

10. The DM server as claimed in claim 9, wherein the identification details of the at least of ME comprise at least one of an International Mobile Equipment Identity (IMEI) and an International Mobile Subscriber Identity (IMSI).

11. The DM server as claimed in claim 9, wherein the addresses of that at least one other DM server comprise at least one of an Internet Protocol (IP) address, a host name, and a Uniform Resource Locator (URL).

12. The DM server as claimed in claim 9, wherein the processing unit is configured to:
   search for the ME according to the received query command in the first list upon receiving the query command broadcasted by the at least one other DM server,
   inform the at least one other DM server having broadcasted the query command of identification of the ME according to the received query command when the ME is identified in the first list, and
   perform at least one action on the identified the ME according to a command received from the at least one other DM server having broadcasted the query command.

13. The DM server as claimed in claim 12, wherein the at least one action comprises at least one of data recovery of the ME and locking of the ME.

14. The DM server as claimed in claim 9, wherein the at least one action comprises at least one of data recovery of the ME and locking of the ME.

15. The DM server as claimed in claim 14, wherein the processing unit configured to send a data recovery command to the at least one other DM server having identified the ME so that the other DM server having identified the ME performs the data recovery in the ME.

16. The DM server as claimed in claim 14, wherein the processing unit configured to send a lock command to the at least one other DM server having identified the ME so that the other DM server having identified the ME performs locking in the ME.

17. A system for managing a device by using an Open Mobile Alliance (OMA) Device Management (DM) protocol, the system comprising:
   at least one DM server that is included in one communication network and connected to at least one other DM server present in at least one other communication network, the at least one DM server configured to identify a first list including identification details of at least one Mobile Equipment (ME) connected to the communication network; identify a second list of addresses of the at least one other DM server; broadcast a query command on an ME, which is not identified in the first list, to the at least one other DM server, based on the second list; and perform at least one action on the ME through the other DM server having identified the ME, when one of the at least one other DM server identifies the ME.

18. The system as claimed in claim 17, wherein the DM server configured to:
   search for an ME according to the received query command in the first list upon receiving a query command broadcasted by the at least one other DM server,
   inform the at least one other DM server of identification of the ME according to the received query command when the ME is identified in the first list, and
   perform at least on action on the identified ME according to a command received from the at least one other DM server having broadcasted the query command.

19. A Mobile Equipment (ME) in a communication network, the ME comprising:
   a memory configured to store data; and
   a processing unit configured to invoke a data recovery management object (DRMO) upon receiving data recovery commands from a DM server; process the commands sequentially; and invoke an upload agent to retrieve data and to transfers the data to the DM server,
   wherein when the ME is not identified in a first list including identification details of at least one ME connected to a communication network where the DM server is included, the DM server is configured to broadcast a query command on the ME to at least one other DM server present in at least one other communication network based on a second list of addresses of the at least one other DM server.

20. The ME as claimed in claim 19, wherein the upload agent is configured to retrieve the data from at least one of a local storage and an external storage of the ME.

* * * * *